W. B. HOWARD.
AUTOMATICALLY TIMED ASPHALT TESTER.
APPLICATION FILED JUNE 21, 1915.

1,225,438.

Patented May 8, 1917.
3 SHEETS—SHEET 1.

WITNESSES:
Fred. Rogers
L. Altman

INVENTOR
Wm. B. Howard.
by ATTORNEY

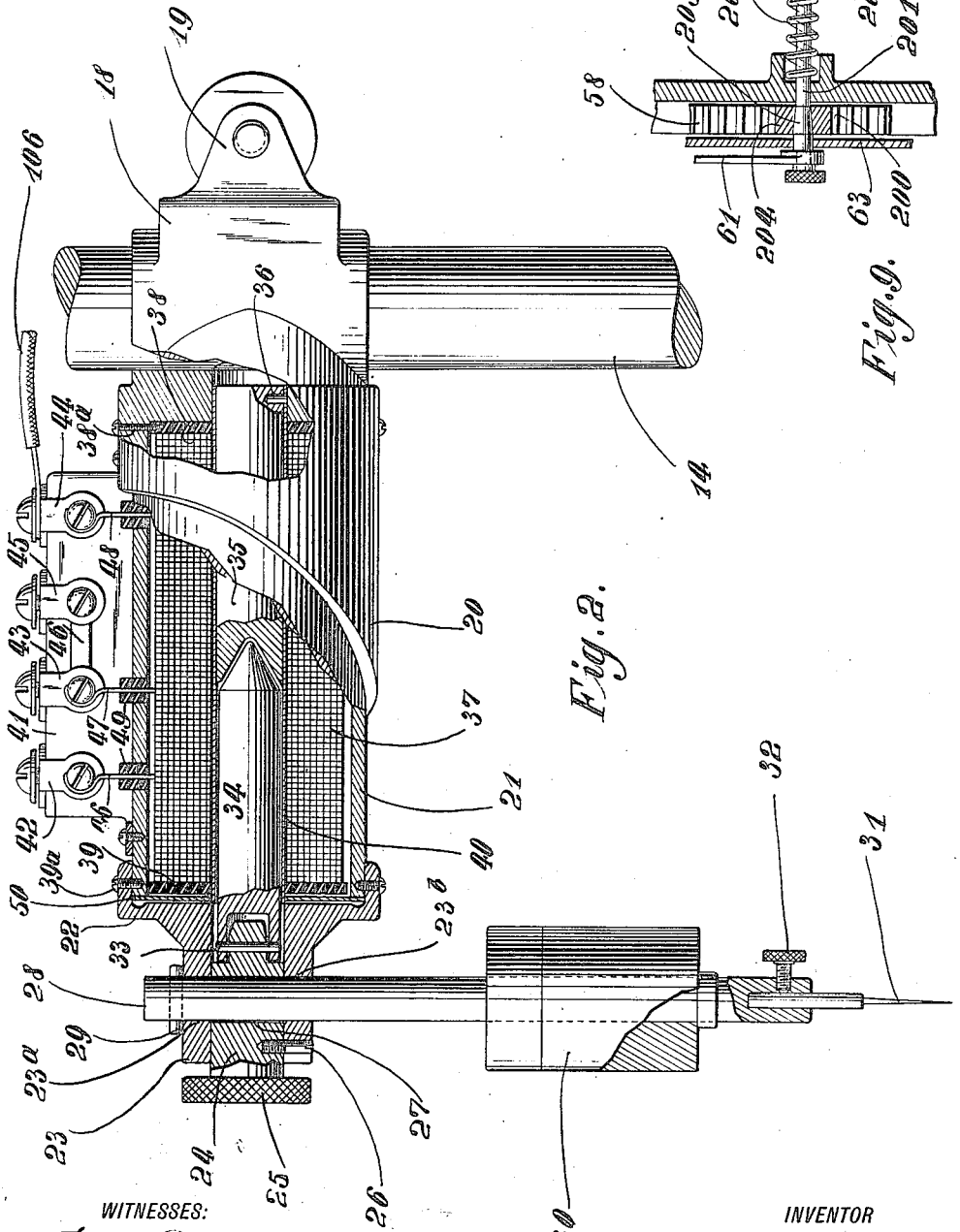

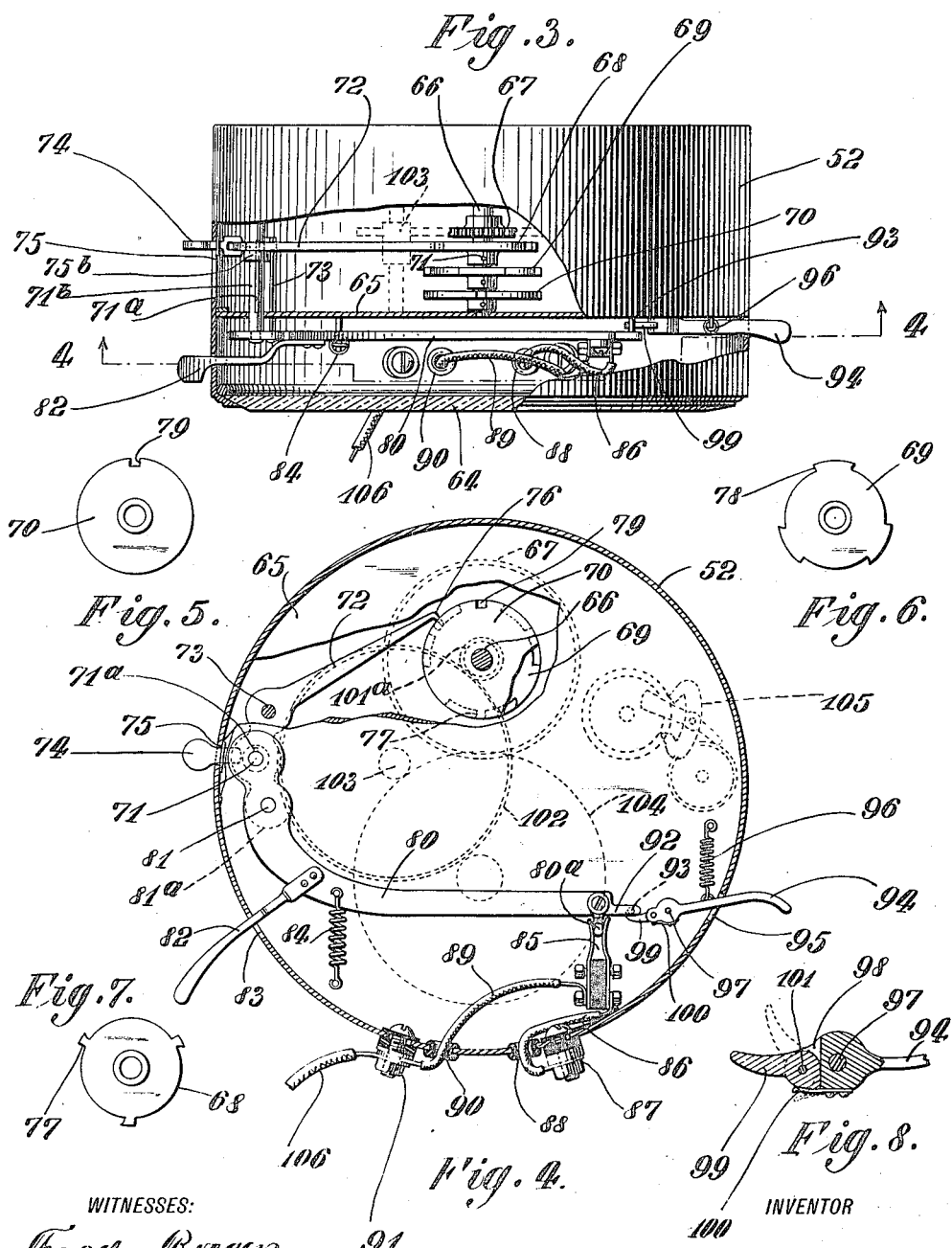

UNITED STATES PATENT OFFICE.

WILLIAM B. HOWARD, OF BROOKLYN, NEW YORK.

AUTOMATICALLY-TIMED ASPHALT-TESTER.

1,225,438.  Specification of Letters Patent.  Patented May 8, 1917.

Application filed June 21, 1915. Serial No. 35,247.

*To all whom it may concern:*

Be it known that I, WILLIAM B. HOWARD, a citizen of the United States, and a resident of the borough of Brooklyn, county of Kings, city and State of New York, have invented certain new and useful Improvements in Automatically-Timed Asphalt-Testers, set forth in the following specification.

My invention relates to machines for testing the viscosity of semi-solids, in which the viscosity causes more or less yielding to take place in a predetermined length of time.

In the testing of viscosity in the general manner contemplated by this invention it is customary to cause a sample of the substance under test to be subjected to a penetrating force through the medium of a needle called a penetrator; to make an accurate measure of the time that the sample has been subjected to this penetrating force; to measure the depth of the penetration of the penetrator; and then, from an appropriate formula, to calculate viscosity.

Originally these various steps were done by a human operator and into the calculations there very often crept the human element of psychological differences usual in the powers of coördination. For example, one operator who released the penetrating force supposedly at the same time that he commenced the time measurement, proved to be either slow or late relatively to another operator performing the same operation.

Machines were therefore constructed in an attempt to eliminate the human factor. In one machine of the prior art the penetrator is normally gripped by a grip, the release of which coördinates with the simultaneous release of a time-measurer limited in its structure to control of the apparatus for but one time interval. This apparatus has also the limitation of setting the time mechanism in motion every time the grip is released, which is many times necessary in setting up the apparatus preliminary to a test. See, for example, the patent to Rawstrom, No. 1,062,032, May 20, 1913.

Another structure intended to eliminate the human element was one in which a magnetic device controlled the penetrating movement of the penetrator and in which the penetrator could be first gripped then released for any one of various time intervals and then again gripped. The limitations of this apparatus were such, however, that the strokes of a pendulum normally making and breaking a controlling circuit were a necessary feature, with the result that the operator was obliged to make one movement of an actuator to accomplish the first step in the timing of a test and was also obliged to watch the swing of the pendulum and time the return movement of the actuator so that the return movement of the actuator would take place immediately after the first swing of the pendulum. Otherwise the grip would be inadvertently released.

A broad object of my invention is not only to eliminate the human factor in the making of a test of viscosity, but also to provide for the free movement of the penetrator without the necessary manipulation of either the actuator or the time-measurer and, in addition, provide for gripping the penetrator after the same has been adjusted automatically releasing the penetrator throughout a predeterminable time-interval by a single movement of an actuator and the automatic regripping of the penetrator after the expiration of the time-interval, without the necessity of making a second premeditated movement of the actuator.

A further object of my invention is also to make possible the selection of any one of various time intervals for the duration of the automatic test while, at the same time, providing for the automatic stopping of the penetrator in the selected time-interval and for the simultaneous starting of the time-measurer and the release of the grip through but a single movement of the actuator.

My invention includes many important details of construction in penetrometers as will be understood more fully from the following specification. which should be read in connection with the accompanying drawings, showing an illustrative embodiment of my invention, forming a part hereof, in which like characters designate corresponding parts in the several figures and in which—

Fig. 2 is a vertical section with parts shown in elevation drawn to an enlarged scale and showing electro-magnetic clutch mechanism;

Fig. 3 is a plan view with parts broken away and with others shown in section illustrating the time measuring mechanism;

Fig. 4 is a front elevation partly in section of the time mechanism;

Fig. 5 is a detail view of one of the time elements;

Fig. 6 is a detail view of a second time element for measuring time intervals;

Fig. 7 is a detail view of a third time element for measuring still shorter intervals of time;

Fig. 8 is a detail sectional view with a part of the handle broken away showing the trigger employed for starting a test; and Fig. 9 is a detail vertical section showing the pin coil and clutch for the pointer of the dial.

Figure 1:
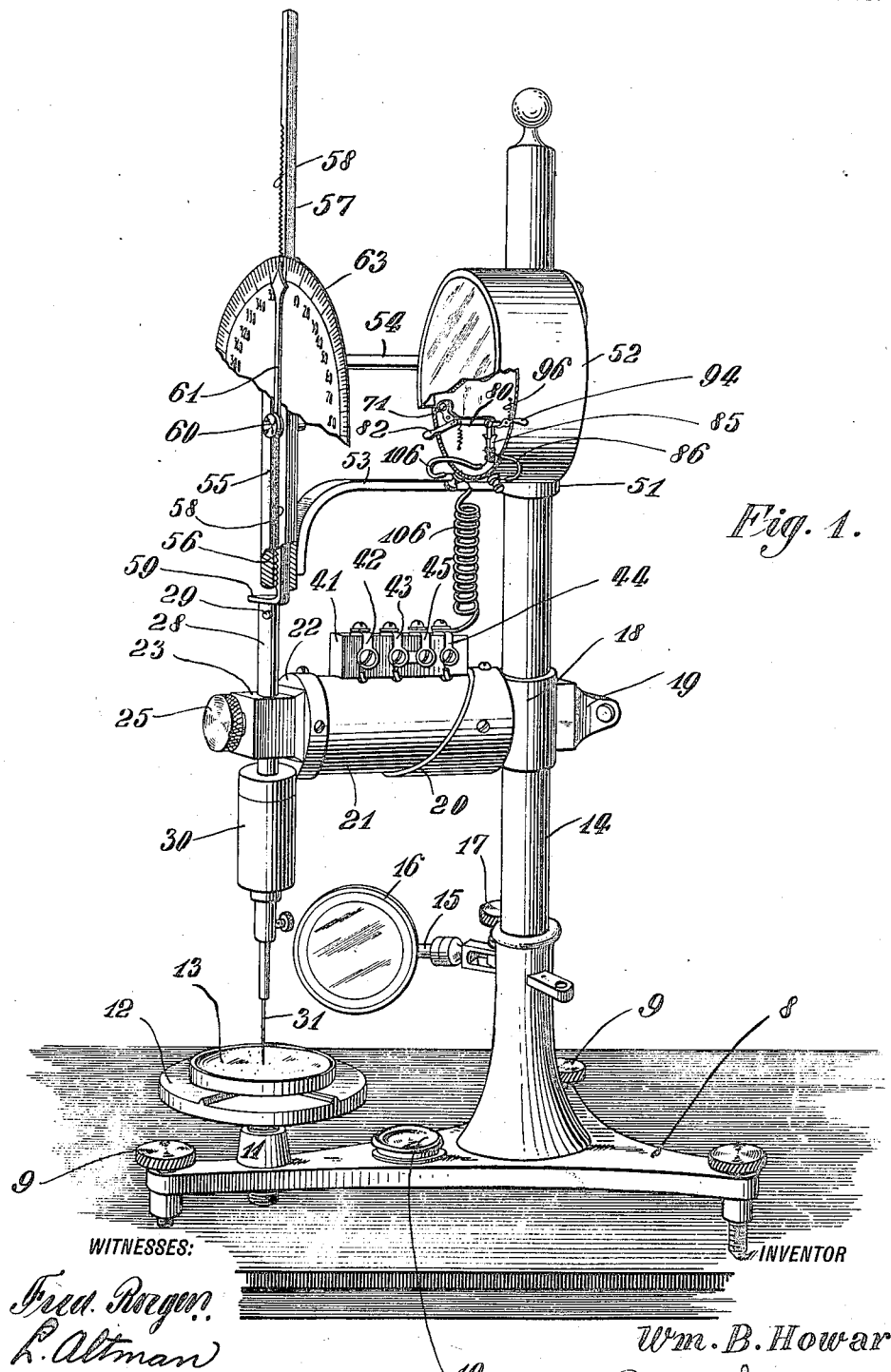
Figure 1 is a perspective view showing in perspective with parts broken away a complete penetrometer embodying my invention.

A base 8 is provided with leveling screws 9 and with a spirit level 10. The base carries a socket 11 and by aid of the latter a table 12 is adjustably supported. Resting upon the table 12 is a cake or fragment 13 of the material to be tested: for instance, asphalt. Extending upwardly from the base 8 is a standard 14 which carries an adjustable arm 15, the latter supporting a mirror 16 for convenient illumination of the piece 13 of material operated upon. A set screw 17 is used for holding the arm 15 in various adjusted positions. A collar 18 is fitted upon the standard 14 and is provided with a clamp 19 for holding it firmly in adjusted position. The collar 18 carries a sleeve 20 and extending through this sleeve is a cylindrical shell 21. This shell carries an end piece 22 having in this instance the form of a cap and provided with an extending portion 23. Slidably mounted within the projecting portion 23 is a clamping block 24 provided with a manually operable head 25 and held normally against turning by a pin and slot 26. Otherwise the clamping block 24 is rendered loose relatively to the extending portion 23. The clamping block 24 is provided with an opening 27, which is substantially in registry with other openings 23ª, 23ᵇ, with which the portion 23 is provided. A penetrator bar 28 extends through these openings and is provided with a stop pin 29 which extends radially through the penetrator bar and prevents excessive downward travel of the latter. The penetrator bar carries a weight 30 and also a needle or penetrator 31, this needle being secured in position by a set screw 32. The weight 30 tends to carry the penetrator bar downwardly until the stop pin 29 comes into engagement with the adjacent upper surface of the extending portion 23. The weight of the bar 28 also contributes to this end.

The clamping block 24 is connected by a pivot pin 33 with a core 34. Another core 35 is secured rigidly to the clamping collar 18 by a pin 36 so that under proper conditions the core 34 may have a slight movement relatively to the core 35. A solenoid winding 37 is located within the cylindrical shell 21 and at the ends of the solenoid winding are disks 38, 39 of insulating material, held in position by fastenings 38ª, 39ª. A tube 40 of non-magnetic metal extends through the winding 37 and supports the core 34, which is movable relatively to it.

Secured to the cylindrical shell 21 is a block 41 of insulating material, carrying binding posts 42, 43, 44 and 45, the binding posts 45 being secured to a connector 46 which leads to the binding post 43. From the binding post 42, 43 and 44, wires 46, 47 and 48 lead to different parts of the winding 37. For this purpose these wires extend through insulating bushings 49. My purpose in providing the wires 46, 47 and 48 and binding posts connected thereto is to enable the solenoid to be used with different kinds of current. Where a weak current is employed a larger number of turns of a solenoid are brought into requisition and where comparatively strong current is relied upon the number of turns of the solenoid may be less than in the instance first stated. A disk 50 located within the cap 22 serves as a support for the adjacent end of the tube 40. This entire mechanism may be termed a grip-means, of which the block 24 is the grip proper.

The movement of the core 34 by deënergization of the solenoid 37 may cause the releasing of the penetrator bar 28 so that this bar may move downwardly while the energization of the solenoid pulls in the core 34 to cause the block 24 to grip the penetrator-bar 28. Mounted adjustably upon the standard 14 is a collar 51 which supports a casing 52. An arm 53 extends downwardly from the collar 51. This arm and another arm 54 support a sleeve 55 which extends vertically and is located over the penetrator bar 28. The sleeve 55 is provided with a passage 56 and extending through this passage is a rack bar 57 provided with teeth 58 and with a foot 59, the latter being adapted to engage the top of the penetrator bar 28. The teeth of the rack bar are in operative engagement with the teeth of a pinion carried upon a revoluble shaft 60, this shaft also carries an indicating pointer 61. This needle moves over a graduated face 63, which is provided with numbers for indicating the degree of travel of the indicating pointer. If, however, the penetrator bar 28 makes any descending or ascending movement, the pointer 61 indicates upon the graduated face 63 the amount of vertical travel of the needle 31.

The graduations in the circular scale are proportioned preferably so that ten degrees or spaces correspond to one millimeter travel of the test needle.

The casing 52 is provided with a glass face 64 and parallel with this face is a partition 65 of sheet metal. A shaft 66 is journaled in the partition 65 and in the casing. This shaft carries a gear wheel 67 and also a number of time wheels 68, 69, and 70 shown more particularly in Figs. 7, 6 and 5. A shaft 71 extends through the partition 65 and is journaled to the same as well as to the casing 52. This shaft is provided with a spline key 71ª. Fitting slidably upon the shaft 71 is a spline bearing 71ᵇ to which is rigidly secured an arm 72. A handle 74 is mounted upon the arm 72 and extends through a slot 75. The operator by grasping the handle 74 and moving the same in the general direction of the length of the slot 75 is able to move the arm 72 in a direction lateral to its length. That is to say the operator can slide this arm and the spline bearing 71ᵇ along the shaft 71, and in doing this he may bring the arm 72 into engagement with any one of the time wheels 68, 69, 70. The time wheel 68 is provided with peripherally disposed lugs 77 of arcuate form, the time wheel 69 being provided with lugs 78, also of arcuate form, but of greater length than the lugs 77. The time wheel 70 is provided with a notch 79, which is a space making a single lug extending nearly around the entire periphery of the wheel, as may be understood from Fig. 5.

Journaled upon the shaft 71 and secured rigidly to one end thereof, is an arm 80. This arm carries a guiding pin 81 and slidably engaging this slide pin is a bearing 81ª forming practically a part of the arm 72. Mounted rigidly upon the arm 80 is a handle 82, which extends outward through a slot 83 in the casing. The operator by grasping the handle 82 can move the arm 80 into different angular positions upon the shaft 71 as a center. A spring 84 is connected to the arm 80 to a pin mounted within the casing 52 for the purpose of retracting the arm 80 into its normal position as indicated in Fig. 4. The arm 80 carries a contact lug 80ª and adjacent to the path of travel of this contact lug is a switch 85. A wire 86 leads from this switch to a binding post 87, this wire extending through an eyelet 88 of insulating material carried by the casing 52. Another wire 89 leads from the switch 85 through an eyelet 90 to a binding post 91. The arm 80 is provided with a finger 92 disposed adjacent the contact lug 80ª and carrying a pin 93. A thumb lever 94 extends through a slot 95 in the casing and is engaged by a retracting spring 96. The thumb lever 94 is mounted upon a pivot 97 and as to form can readily be understood from Fig. 8. The thumb lever is provided with a pair of extending portions, one of which appears at 98, these portions being parallel with each other and exactly alike. A finger 99 is located between these extending portions and is engaged by a leaf spring 100. The form of the finger 99 is such that, under pressure of the leaf spring 100, the finger normally tends to assume the position indicated by full lines in Fig. 8. When the finger is displaced from its normal position, as indicated by dotted lines, in this figure, it snaps back into its normal position. The finger is mounted upon a pivot pin 101.

The operator by grasping the thumb lever 94 and moving it in a clockwise direction according to Fig. 5, causes the arm 80 to rock slidably in a contra-clockwise direction according to this figure, so that the contact lug 80ª is drawn out of engagement with the switch 85. The return of the thumb lever 94 to its normal position is somewhat independent of the return of the arm 80 to its normal position, because if the finger 99 happens at any particular instant to be above the pin 93 according to Fig. 5, the retractile spring 96 in causing the thumb lever 94 to drop in a counter-clockwise direction, then the finger 99 merely glides idly over the pin 93.

The operator by grasping the handle 82 can rock the arm 80 without disturbing the thumb lever 94. The shaft 66 carries a gear pinion 101ª which meshes with a larger pinion 102. This gear and pinion together with various other gear members 103—104 constitute a train of clockwork, which is provided with an escapement 105. This clockwork is driven at a uniform speed and as the time wheels 68, 69 and 70 are all mounted upon a single shaft 66 their speed is constant. Since, however, the arm 72 may be brought into engagement with any one of the three time wheels, as above described, different periods of time may be virtually marked off, by causing the point 76 of this arm to be held up for different periods of time, by action of the lugs 77, 78 or the portion 79 of the time wheel 70. A wire 106 leads from the binding post 91 to the binding post 44. Thus the arm 80 constitutes an actuator, a single movement of which causes the deënergization of the grip-means by opening a circuit at switch 85 and starts the operation of the appropriate one of the time-elements 68, 69 or 70, and is automatically returned to its original position by the spring 84 at the expiration of the predetermined time-interval when the point 76 of arm 72 is released by the periphery of the time element such as 68. Furthermore, the removal of one of the connections such as 106 from the post 91 independently effects the deënergization of the solenoid without disturbing any of the parts such as the actuator 80 or a time-measurer 68, etc. This is useful when the apparatus is being adjusted for a test.

The operation of my device is as follows:—

The parts being assembled and arranged as above described, the solenoid is connected with a suitable source of electricity by aid of the binding posts 42, 43, 44 and 45 so that a part or all of the turns of the solenoid are energized according to the power of the source of electricity employed. The penetrator bar 28 is however, first raised and a block 13 or piece of material to be tested is placed in position upon the table 12. The device having been properly leveled, the bar 28 is moved downwardly until the needle 31 rests upon the material to be tested (say asphalt). So long as the circuit remains complete through the solenoid 37, the core 34 is energized and tends to move to the right according to Fig 2, so that the clamping block 24 holds the penetrator bar 28 and prevents it from descending. It is desirable, however, not to make the last electric connection until all the adjustments preliminary to a test are completed, when the making of this connection holds the penetrator fast preparatory to making the test. The operator now grasps the thumb lever 94 and turns it slightly in a clockwise direction according to Fig. 4. This action shifts the position of the arm 80 and draws the contact lug 80ª out of engagement with the switch 85. The arm 72 having been previously adjusted, as above described, so that the point 76 rests against some one of the time wheels 68, 69 or 70, and engaged directly one of the lugs 77 or 78, or the outer edge of the time wheel 70, as the case may be, the clockwork is started into action by practically the same movement that disconnects the switch lug 80ª from the switch 85. That is to say the rocking of the actuator 80 by aid of the thumb lever 94 causes the arm 72 to be shifted angularly so that the point 76 is moved upwardly and enabled to rest upon the outermost peripheral surface of the time wheel with which it is for the moment associated. The time wheel being thus freed or released, the shaft 66 begins to turn and the clockwork continues in motion until the point 76 drops off the lug 77 or 78, or drops into the notch 79, as the case may be. During this period of time, while the arm 72 is held up, the arm 80 is held in such position that the contact lug 80ª does not touch the switch 85; when however, the arm 72 drops, at the expiration of the time interval, that is when, by rotation of the time wheel associated momentarily with it, the arm 72 is allowed to swing slightly clockwise according to Fig. 4, the arm 80 by dropping into its normal position under control of the spring 84 causes the switch lug 80ª to engage the switch 85. This action completes the circuit through the solenoid 37 and by causing the core 34 to move to the right according to Fig. 2, the clamping block 24 grips the bar 28 and holds it rigidly in position.

The operator by noting the position of the indicating needle 61 relatively to the graduated face 63 can readily determine the distance to which the needle 31 has penetrated the asphalt during the time the clockwork was in motion, and he knows this period because in selecting the time wheel for the experiment he prearranged the period of time. The lug 77 shown in Fig. 7 being shorter than the lug 78 in Fig. 6 a measurement made by aid of the time wheel shown in Fig. 7 would represent a shorter duration of time than one made by aid of the time wheel shown in Fig. 6. Similarly a time period measured by aid of the time wheel shown in Fig. 5 would be of still longer duration.

To facilitate the use of the instrument the pinion 200 may be arranged to have clutch engagement with the pointer shaft 201, carrying the pointer 61. By pressing in the knob 202 against spring 203 the conical enlargement 204 is forced out of grip with the conical base 205 of pinion 200 so that the turning of the knob 202 adjusts the pointer, as to zero on the scale, without any turning of the pinion 200 or movement of rack bar 58.

Preferably when the piece of asphalt is first rested upon the table 12 and the apparatus is otherwise in condition for action, the parts may be adjusted so that the pointer or needle 61 indicates zero upon the graduated face 63. This renders the reading somewhat simpler than would be the case if allowances had to be made.

I do not limit myself to the precise mechanism here shown as variations may be made therefrom without departing from the spirit of my invention, the scope of which is commensurate with my claims.

What is claimed and what is desired to be secured by United States Letters Patent is:—

1. Apparatus for testing viscosity comprising in combination, a penetrator-bar adapted to force a penetrator into the substance to be tested and being normally free to move for the purpose of adjustment; a grip-means to hold said penetrator-bar against operating movement; a time-interval-controller; an actuator operable by a single movement for automatically causing the grip means to release said penetrator-bar and the time-interval-controller to start in operation; automatically operating means for effecting the regripping of said penetrator-bar after a predeterminable time-interval; and said grip-means having provisions operable independently from the control of said time-interval-controller to effect the release of said penetrator-bar.

2. Apparatus for testing viscosity comprising in combination a penetrator-bar adapted to force a penetrator into the substance to be tested; a normally inactive grip for holding said penetrator-bar against the operating force of said bar; a grip-operator for making said normally inactive grip active to hold said penetrator-bar after it has been freely adjusted; a time-interval-controller; an actuator operable by a single movement for automatically stopping the operation of said grip-operator and starting the operation of said time-interval-controller; and automatic means for returning said actuator to normal position after a predetermined time interval to restore the operation of said grip-operator for the purpose of causing the grip again to hold the penetrator-bar.

3. Apparatus for testing viscosity comprising in combination, a penetrator-bar adapted to force a penetrator into the substance to be tested and being normally free to move for the purpose of adjustment; an electro-magnetic grip to hold said penetrator-bar against operating movement; a time-interval-controller; an actuator-switch; openable circuit connections between said grip and said actuator-switch and adapted to include a source of electricity, said connections adapted, when closed, to cause said grip to hold said penetrator-bar against operating movement; an actuator under the control of said time-interval-controller and operable by a single movement for automatically opening said actuator-switch and starting the operation of said time-interval-controller; and automatic means for returning said actuator to normal position after a predeterminable time-interval to close said actuator-switch, causing said grip to operate.

4. Apparatus for testing viscosity comprising in combination, a penetrator-bar adapted to force a penetrator into the substance to be tested; a grip for said penetrator-bar; a time-interval-controller having provisions for any one of various time-intervals for control; an actuator normally causing said grip to operate and operable by a single movement to release said grip and start said time-interval-controller in operation; means for holding said actuator throughout the predeterminable time interval and then returning it to normal position to cause said grip to operate; and means for varying the time-interval of control of said time-interval-controller upon said actuator.

5. Apparatus for testing viscosity comprising in combination, a penetrator-bar adapted to force a penetrator into the substance to be tested; a grip for said penetrator-bar; a time-interval-controller having provisions for any one of various time-intervals for control; an actuator normally causing said grip to operate and operable by a single movement to release said grip and start said time-interval-controller in operation; means for holding said actuator throughout the predeterminable time interval and then returning it to normal position to cause said grip to operate; means for varying the time-interval of control of said time-interval-controller upon said actuator; and means independent of said actuator and said time-interval-controller for releasing said grip to permit movement for adjustment of said penetrator-bar.

6. In apparatus for testing viscosity, a movable penetrator-part and adapted to occupy various positions at the start of a test; a dial and pointer for indicating movement of said penetrator-part; gearing comprising a pinion for conveying the movement of said penetrator-part to said pointer; an endwise movable shaft carrying both said pinion and said pointer and having a conical friction part for adjustably clutching said pinion whereby said pointer may be set at zero at the commencement of a test regardless of the position of said penetrator-part.

7. In apparatus for testing viscosity, a movable penetrator-bar; an electro-magnetic grip for gripping said bar having various windings, and connections adapting it for operation by any one of various kinds of electric energy.

8. Apparatus for testing viscosity comprising a vertical standard having a supporting base; a test-table adjustably mounted relatively to said base; a movable penetrator-bar, a penetrator-bar-grip for said bar adjustably mounted on said standard; and a movement indicator adjustably mounted on said standard.

In witness whereof, I have signed my name to this specification, in the presence of two subscribing witnesses.

WM. B. HOWARD.

Witnesses:
　LILLIE ALTMAN,
　MATTHEW MONAHAN.